Aug. 15, 1961 L. BUCALO 2,995,930
INSTRUMENT FOR DETECTING AND INDICATING THE
DIRECTION OF A FLUID STREAM
Filed April 5, 1957

INVENTOR.
LOUIS BUCALO
BY John C. McGregor
ATTORNEY

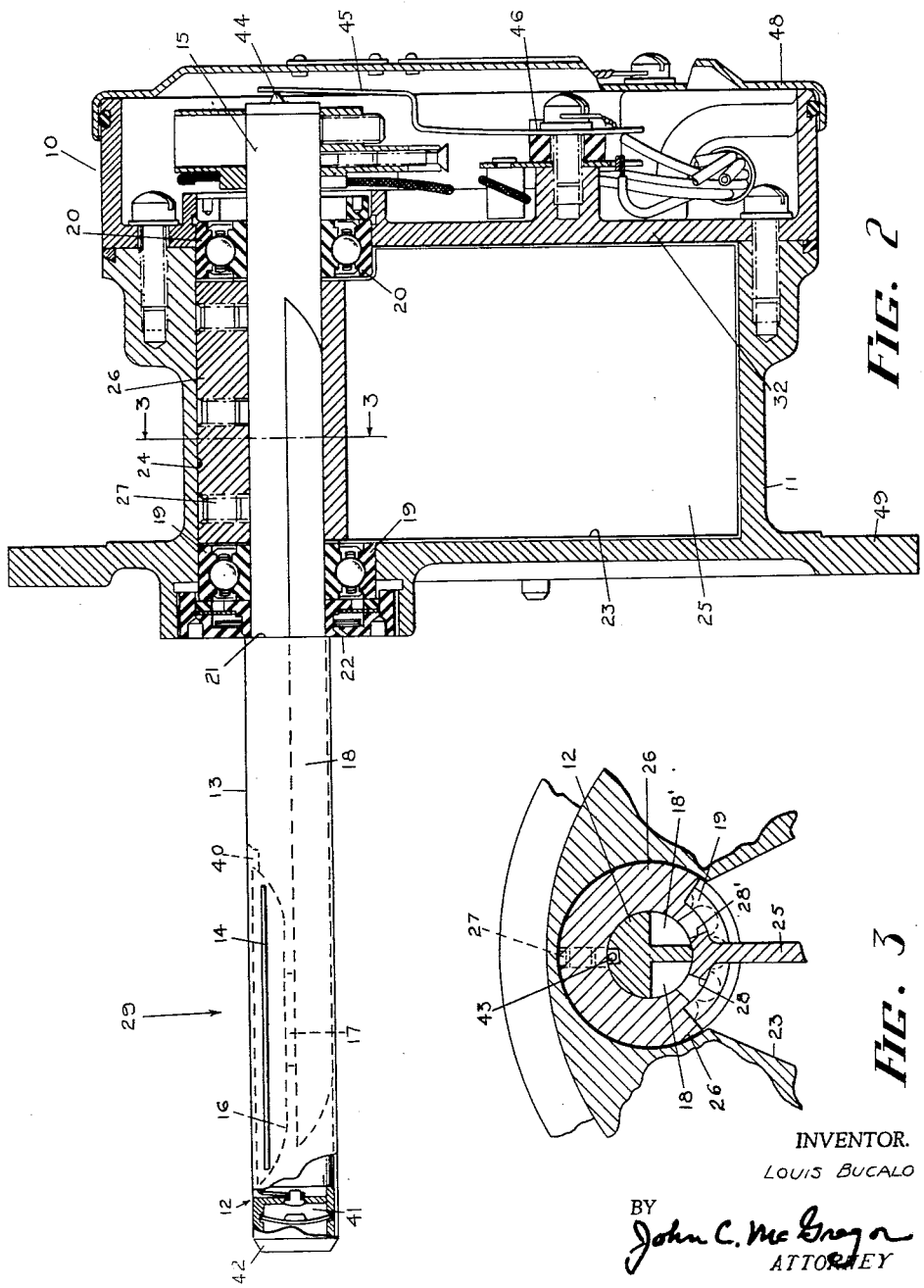

United States Patent Office 2,995,930
Patented Aug. 15, 1961

2,995,930
INSTRUMENT FOR DETECTING AND INDICATING THE DIRECTION OF A FLUID STREAM
Louis Bucalo, Holbrook, N.Y., assignor to Specialties, Inc., Syosset, N.Y., a corporation of New York
Filed Apr. 5, 1957, Ser. No. 651,056
3 Claims. (Cl. 73—188)

This invention relates to instruments for detecting and indicating the direction of a fluid stream, and more particularly to such instruments adapted for use in determining a flight characteristic of an airplane such as angle of attack and sideslip.

Instruments have been developed for detecting and indicating airstream direction, as shown, for example, in U.S. Patents Nos. 2,445,746 and 2,701,473. These instruments include a probe which rotates, under influence of pneumatic forces impressed on spaced areas of its surface, to a position of static balance or equilibrium. The angular position of the probe relative to the body of the instrument or of the carrier vehicle represents the measured angle of the fluid stream. The present invention is concerned with providing more efficient utilization of pneumatic signals sensed by a probe of relatively small size, with providing improved durability and accuracy, and with providing strong, noise-free, output signals capable of use at points remote from the instrument.

In accordance with the present invention, there is provided an instrument including a body portion in which an elongated probe is mounted for free rotation about its axis, the inner end of the probe extending into a closed, air-tight chamber in the housing and the outer end of the probe extending in cantilever fashion out of the body of the instrument to extend into the fluid stream.

The probe includes circumferentially spaced inlet ports adjacent its outer end which are placed separately in communication with different portions of the air-tight chamber via passageways formed in the shank of the probe. Fixed to the probe to turn therewith is a vane or paddle which completes the isolation from each other of the two passageways communicating with the inlet ports. The limits of angular travel of the probe and paddle are determined by adjustable stops in the chamber, and the angular position of the probe relative to the body of the instrument is detected by means of electrical units such as potentiometers, selsyns or the like. The electrical units are preferably detachably mounted on the back of the wall which defines the paddle chamber. In order to facilitate heating of the portion of the probe which extends into the windstream, an electric resistance heater extends substantially the entire length of the exposed portion of the probe adjacent the stagnation line thereof between the ports. The electrical connection to the resistance heater passes within the probe to the innermost end thereof, terminating in a point contact located precisely on the axis of rotation and engaged by a stationary contact.

A representative embodiment of the invention from which the above and other features will be readily apparent is described below having reference to the accompanying drawings, in which:

FIGURE 2 is a view in predominantly vertical section taken on the line 2—2 of FIGURE 1 looking in the direction of the arrows; and FIGURE 3 is a fragmentary view in vertical section taken on the line 3—3 of FIGURE 2.

Figure 1:
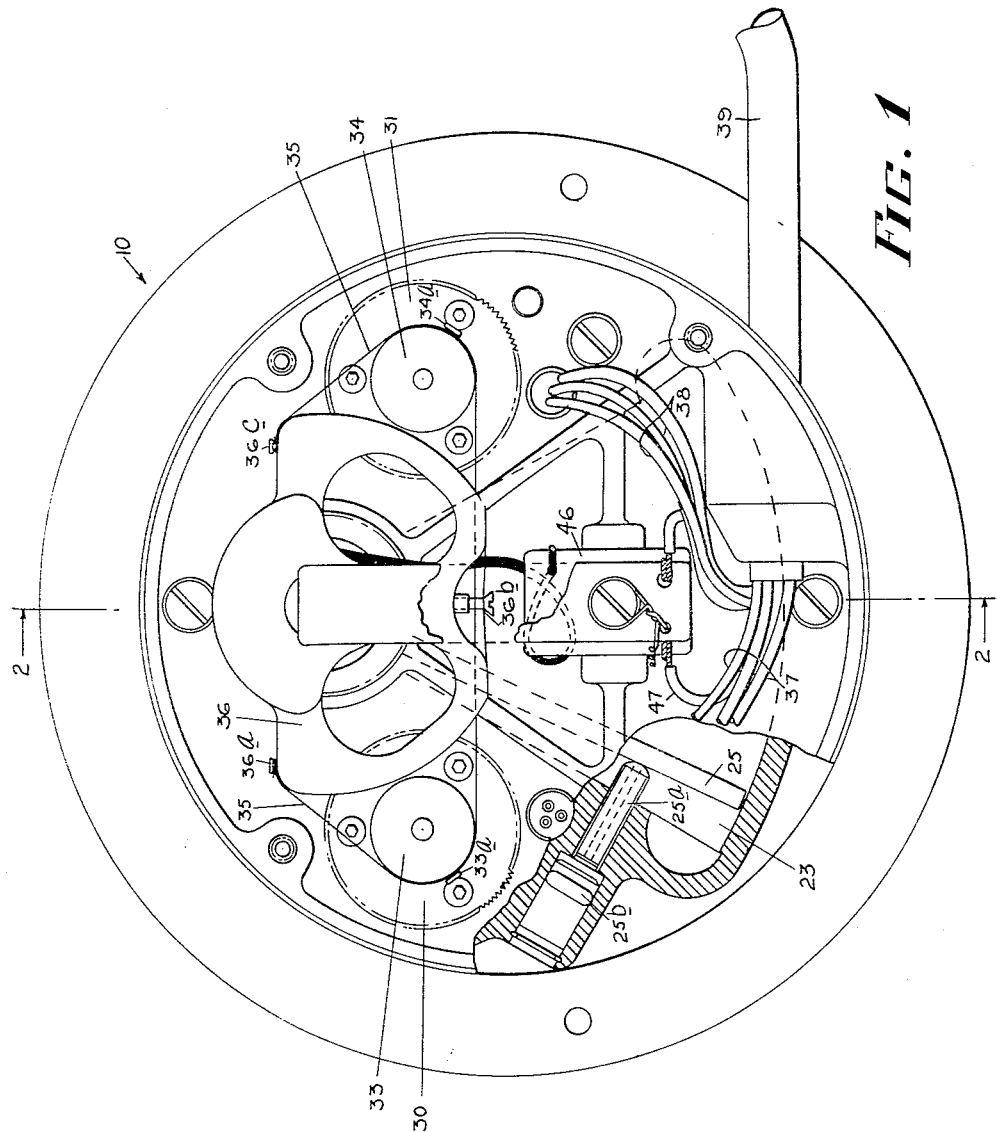
FIGURE 1 is a view of the instrument with the cover portion removed to expose working parts thereof and partly broken away in vertical section to expose portions of the pneumatic system.

Referring to the drawings, the invention is illustrated as embodied in an airstream direction indicating instrument 10, including a housing portion 11 and a probe assembly 12. The probe assembly 12 which is described and claimed in co-pending application Serial No. 642,093, filed February 25, 1957, includes an outer portion 13 adapted to extend into the airstream and formed with a pair of admission ports or slots 14 (only one of which is visible in the drawing) circumferentially spaced in the cylindrical probe surface by approximately 90 degrees. The admission ports 14 are each connected by identical pneumatic channels to the inner end 15 of the probe assembly. These channels, only one set of which is illustrated in FIGURE 2 of the drawings, include a first channel 16 extending axially of the probe for the length of the admission port 14, a centrally located bypass opening 17, and an elongated transmission channel 18 extending into the housing 11.

The probe assembly 12 is mounted by means of its cylindrical inner portion 15 for axial rotation in a pair of ball bearing assemblies 19 and 20. The outer or exposed end of the probe assembly is encased in a tubular sheath 21 in which the ports 14 are formed and which closes the otherwise open channels 16 and 18. The sheath 21 terminates at the point of entry of the probe assembly 15 in the housing 11, at which point is located a sealing gland assembly 22 which also engages the ball bearing assembly 19. Between the ball bearing assemblies 19 and 20 the housing 11 is formed with an air-tight chamber 23 having a cylindrical upper portion 24 co-axial with the probe assembly 12 beneath which is disposed the major portion of the chamber in generally segment form. Received in the chamber 23 is a vane or paddle 25 which in profile spans the segment-shaped portion thereof with close clearances, the vane being fixed to the inner end 15 of the probe assembly by means of a generally cylindrical collar 26 which fits closely but movably in the cylindrical portion 24 of the chamber. The vane 25 is fixed to the probe assembly 12 to turn therewith by means, for example, of set screws 27.

The collar 26 is formed on either side of the vane 25, as best seen in FIGURE 3, with ports 28 and 28' which respectively connect the channels 18 and 18' with the chamber 23 on opposite sides of the vane 25. In this fashion, relatively low pneumatic impedance is established from the probe ports 14 to the chamber 23, while relatively high pneumatic impedance is established across the vane 25, i.e., between the channels 18 and 18'. Thus, pneumatic signals in the form of static pressures will exert differential forces on opposite sides of the vane 25, causing the vane to swing in an arc within the segment-shaped chamber 23 until the two sets of ports 14 are in a position of balance with respect to the airstream direction. The limits of travel of the vane 25 and hence the turning movement of the probe assembly 12 are defined by adjustable stops at either side of the chamber. Only one of the adjustable stops, identified by the numeral 25a, is visible in FIGURE 1 of the drawings. Adjustment of the stops is effected externally by removing O-ring plugs 25b and turning the stops in their threaded mountings.

In the illustrated arrangement, balance obtains when the probe is rotated so that the airstream impinges on the exposed portion in the direction of the arrow 29 (FIGURE 2). The port 14, which is visible in FIGURE 2, will then be the same number of degrees away from the airstream on one side as is its companion port on the other side. A change in the angular relationship between the airstream and the probe will result in differential pneumatic pressures in the ports 14 and the channels 18 and 18' which will drive the vane 25 to a position at which balance again obtains.

The relative angular position of the rotatable probe assembly 12 in the housing 11 is measured by means of a pair of potentiometers 30 and 31 mounted on the opposite side of the wall 32 of the housing from the air-tight chamber 23. The potentiometer assemblies 30 and 31 include rotors 33 and 34 respectively coupled by a flexible wire 35 to a spider 36 affixed to the inner end of the probe assembly 12 to turn therewith. The flexible wire 35 is secured at one end to a post 36a on the spider 36, passes around the rotor 33 of the potentiometer 30, to which it attaches by means of a post 33a, extends horizontally to an adjustable post 36b on the lower side of the spider 36, passes around the rotor 34 of the potentiometer 31, to which it is attached at a post 34a, and terminates at its other end in a post 36c on the spider 36.

Rotation of the probe assembly 12 about its axis will therefore drive the potentiometer rotors, and the positions thereof will be represented by the electrical signals from the potentiometers. Each potentiometer includes three terminals connected respectively to opposite ends of the electrical resistance and to the slide tap. The three terminals of each potentiometer 30 and 31 are connected by electrical conductors 37 and 38 respectively to a conduit 39 which couples its instrument to suitable sources of electrical power and to indicating instruments located elsewhere.

The arrangement of the potentiometers on the back wall 32 of the chamber 23 is such that they can be readily replaced or removed for repair. Also, different electrical indicating units such as selsyns can be used to replace them without necessitating important changes in the design of the basic instrument. Whichever type of electrical indicating unit is used, it will be seen that the limits of travel of the vane 25 and the probe 12 are controlled independently of the electrical units. Thus, severe strains which might be imposed on the system are absorbed by relatively robust portions thereof. There is little likelihood, therefore, that the critical setting between the probe and the electrical units will be upset.

In order to control icing of the exposed portions of the probe assembly 12 an electrical resistance heater is provided along the stagnation axis which is located along the cylindrical surface of the exposed portion of the probe midway between the ports or slots 14. The heater element (not shown) rests in a space 40 located just beneath the surface of the shell 21 and is connected at its outer end to a thermostatically controlled switch 41 by a conductor 42 and at its inner end is connected by a conductor 43 (also seen in FIGURE 3) to a pointed contact 44 located precisely on the turning axis of the probe assembly. The contact 44, the conductor 43, the resistance heater, and the conductor 42 are all electrically insulated from adjacent parts of the instrument, and the action of the thermostatic control 41 selectively grounds the circuit to establish a flow of current through the heater. The electrical energy for the heater circuit enters the probe assembly 12 through a spring contact 45 which engages the fixed contact 44, the spring contact 45 comprising a flat spring element secured at its base end to a terminal block 46 to which electrical conductors 47 from the conduit 39 are connected. The back of the instrument, including the potentiometers 30 and 31 and the heater energizing components, is closed by a weather-tight cover 48. To facilitate mounting the completed instrument, the housing 11 is formed on its front face with a mounting flange 49.

While the invention has been described above having reference to a preferred embodiment thereof, it will be understood that it can take various forms and arrangements within the scope of the invention, which should not, therefore, be regarded as limited except as defined in the following claims.

I claim:

1. In an instrument for detecting the direction of a fluid stream, an instrument body having a closed chamber therein, said chamber including a substantially cylindrical first portion and, communicating directly therewith, a second portion in the shape of a segment of a larger cylinder, the cylindrically shaped portions being substantially coaxial, elongated probe means journalled in the instrument body for axial rotation and extending into the cylindrical first portion of said chamber coaxially therewith, wall means defining first and second port means in the portion of the probe means outside of the instrument body, said port means being spaced apart in the direction of movement of the probe means and both facing generally in the direction of the fluid stream, a vane means including a cylindrical sleeve portion surrounding the probe means to turn therewith within the cylindrical first portion and carrying the vane, thereby to couple the vane directly to the probe means to move therewith, said vane and the portion of the probe means to which it is affixed dividing the second chamber portion into two parts, the clearance between the probe means and the first chamber portion and between the vane and the second chamber portion establishing a relatively high pneumatic impedance between the said parts of the chamber, and first and second pneumatic transmission channels in said probe means respectively connecting the first and second port means to the respective parts of the chamber.

2. An instrument as set forth in claim 1 including a pair of bearings spaced apart axially of the probe means and carried by the instrument body, said bearings engaging the probe means respectively closely adjacent the ends of said cylindrical sleeve.

3. An instrument as set forth in claim 2, the inner end of said probe means remote from said portion of the probe means outside of the instrument body extending through its supporting bearing, wall means defining a second chamber at the back of the body portion of the instrument to receive the extending inner end of the probe means, and means responsive to rotation of said vane and probe means mounted in said second chamber.

References Cited in the file of this patent

UNITED STATES PATENTS

| | | |
|---|---|---|
| 2,515,251 | Morris | July 18, 1950 |
| 2,699,065 | Blair | Jan. 11, 1955 |
| 2,701,473 | Fieldgate | Feb. 8, 1955 |
| 2,832,217 | Hamren | Apr. 29, 1958 |